(12) United States Patent
Whittington et al.

(10) Patent No.: US 8,473,323 B2
(45) Date of Patent: Jun. 25, 2013

(54) METHOD AND APPARATUS FOR MANAGING AND SYNCHRONISING VARIANT BUSINESS STRUCTURES

(75) Inventors: Dick Whittington, York (GB); Simon Hodgson, York (GB)

(73) Assignee: Mood Enterprises Ltd, Crowthorne (GB)

( * ) Notice: Subject to any disclaimer, the term of this patent is extended or adjusted under 35 U.S.C. 154(b) by 1431 days.

(21) Appl. No.: 11/165,149

(22) Filed: Jun. 23, 2005

(65) Prior Publication Data

US 2005/0289010 A1 Dec. 29, 2005

(30) Foreign Application Priority Data

Jun. 28, 2004 (GB) .................................. 0414336.8

(51) Int. Cl.
*G06Q 10/00* (2012.01)
(52) U.S. Cl.
USPC .................. 705/7.22; 705/7.39; 707/999.001; 717/104
(58) Field of Classification Search
None
See application file for complete search history.

(56) References Cited

U.S. PATENT DOCUMENTS

| | | | |
|---|---|---|---|
| 6,523,027 B1 * | 2/2003 | Underwood | 1/1 |
| 6,601,233 B1 * | 7/2003 | Underwood | 717/102 |
| 6,609,128 B1 * | 8/2003 | Underwood | 707/610 |
| 6,892,192 B1 * | 5/2005 | Geddes et al. | 706/14 |
| 6,904,449 B1 * | 6/2005 | Quinones | 709/203 |
| 7,069,101 B1 * | 6/2006 | Arackaparambil et al. | 700/121 |
| 7,100,195 B1 * | 8/2006 | Underwood | 726/2 |
| 7,310,780 B2 * | 12/2007 | Diering et al. | 715/764 |
| 7,373,358 B2 * | 5/2008 | Ronnewinkel et al. | 1/1 |
| 2003/0144868 A1 * | 7/2003 | MacIntyre et al. | 705/1 |
| 2003/0200130 A1 * | 10/2003 | Kall et al. | 705/8 |
| 2003/0215214 A1 * | 11/2003 | Ma | 386/52 |
| 2003/0233249 A1 * | 12/2003 | Walsh et al. | 705/1 |
| 2004/0073477 A1 * | 4/2004 | Heyns et al. | 705/10 |
| 2004/0176980 A1 * | 9/2004 | Bulitta et al. | 705/2 |
| 2004/0220825 A1 * | 11/2004 | Schwerin-Wenzel et al. | 705/1 |
| 2004/0243458 A1 * | 12/2004 | Barkan | 705/9 |
| 2005/0039145 A1 * | 2/2005 | Diering et al. | 715/853 |
| 2005/0043977 A1 * | 2/2005 | Ahern et al. | 705/7 |
| 2005/0091093 A1 * | 4/2005 | Bhaskaran et al. | 705/7 |

OTHER PUBLICATIONS

Business-process modelling and simulation for manufactaring management: K.D. Barber, F.W. Dewhurst , R.L.D.H. Bums , J.B.B. Rogers. Business Process Management Journal; 2003; 9, 4; ABI/INFORM Global p. 527.*
Conceptual simulation model for strategic decision evaluation in project management Henlanta Doli. Ali Jaafari Logistics Information Management 2001; 15; ABI/INFORM Global; p. 88.*
Development of software selection criteria for supply chain solutions B.S. Sahay , A.K. Grrpta, Industrial Management+ Data System; 2003; 103, 1/2, ABI/FORM Global p. 97.*
Towards integrated manufacturing planning with common tool and information sets Frank Dewhurst , Kevin Barber , J J R Rogers, J.J.B. Rogers, International Journal of Operations & Production Management; 2001; 21, 11; ABI/INFORM Global p. 1460.*

* cited by examiner

*Primary Examiner* — Gurkanwaljit Singh
(74) *Attorney, Agent, or Firm* — Grady K. Bergen; Griggs Bergen LLP

(57) ABSTRACT

The invention to which this application relates is the provision of a method and apparatus which allows the graphical representation of organizations and the interpretation of business structures and in particular allows the representation of variants within said business structures and allows these variants to be dealt with in an organized and more efficient manner than is conventionally possible. Thus, several different variants of an organizational model can be created and compared. Typically all of the variants include the components, interfaces, references and elements of the original organizational model.

14 Claims, 4 Drawing Sheets

METHOD AND APPARATUS FOR MANAGING AND SYNCHRONISING VARIANT BUSINESS STRUCTURES

This application claims foreign priority benefits under 35 U.S.C. §119(a)-(d) to British Patent Application No. 0414336.8, filed Jun. 28, 2004.

The invention to which this application relates is for the provision of a method and apparatus which allows the organisation and interpretation of business structures and in particular takes into account variants within said business structures to deal with the same in an organised and more efficient manner than is conventionally possible.

The concept of variants and variation in general applies widely within organisation structures and business in general. For example, one area in which variation applies is to business processes. For example in a business process within an insurance company which relates to the processing of insurance claims, the insurer will define a collection of variant processes that apply such as to particular types of policy and/or in particular locations. Another example is in the context of management structures; for example, a general team structure may require variation under certain operating situations and in a further example, variation can be used in the planning of a business; for example, each planned future state of the business may be described as a variant of the current state.

In a yet further application, a general structure can be defined for the purpose of consistent contextual re-use of common underlying principles. The general structure is then "instantiated" many times within different business contexts. Each of these "instances" can be interpreted as a variant of the general case.

It will therefore be appreciated that in all of these examples and many other uses the provision of variation to a structure is a necessity in order to allow the structure to be adaptable to actual operating conditions and in all applications, the variants themselves can be subject to further variation, without limit.

In order to implement business structures organisations in many industries have recognised and registered benefits from the construction, communication and live deployment of graphical visualisations of their structures and operations. Such benefits include improvements in the areas of change, risk and performance management, and quality implementation.

However, it is found that while the concept of variation and the implementation of the same applies widely within business, difficulties are currently experienced in implementing these variances within a system which allows the generation of a suitable graphical implementation and representation of the same. Thus the organisations' implementation of variants is being hindered by these problems.

There are various known items of prior art available which could be implemented and these include Computer-Aided Software Engineering (CASE) Tools which allow the management of hierarchically structured information. For example, patent number EP0903674 addresses problems relating to the management of hierarchically-structured information, but within the context of efficient copying and sharing, including sophisticated methods for merging hierarchies.

The present invention differs in that it enables the creation of parallel hierarchies that are permitted to diverge in order to describe differing situations. Thus the current invention allows synchronisation of the divergence of the hierarchies in a way that enables understanding and control of the impact of change.

A further item of prior art is Diagramming Tools which allow flexible visual connectivity between elements. This form of tools have no underlying schema and so the meaning associated with a diagram is either added by annotation, or assumed to be expressed orally (i.e. as the diagram is presented). In the current invention these connections are codified. This allows changes within one structure to be automatically analysed in terms of potential impact within known variants of the structure (e.g. removal of a step from the process, which may need to be propagated across certain variants).

A yet further area of prior art is with respect to Software component management and this component approach to software construction is represented in EP0883057 and WO0122331. Related to this approach is the notion of autonomous intelligent software agents, which have been widely reported in recent years. A number of patents have emerged such as WO0102952. These inventions assert a component approach to software construction whereby components are able to perform "intelligently" through deployment of sophisticated analysis techniques including "learning". In the current invention the components represent business components and the capabilities of the current invention are not intended for execution as occurrences within a software system, but are intended for analysis and communication purposes by organisation designers and quality managers. Furthermore the structuring and navigation mechanisms offer functions not required, and so not provided, by such other methods; e.g. automatic navigation between variant structures.

A further known area of prior art is configuration management. This requires the ability to manage variant structures, and commercially available products address this. Such products differ from the present invention in the following respect in that the current invention represents business capabilities which means that they can comprise complex collections of dependent elements including business processes, performance measures, organisational responsibilities, risks, application systems, and so on. The components managed by the prior art software configuration approaches comprise only software components and related materials. Furthermore the current invention allows for the analysis of differences between variants from multiple perspectives, including intention, context, structure, and connectivity. This is in contrast to the much more limited structural perspectives offered by existing software configuration management methods.

The use of graphical approaches to business development and transformation increasingly play a significant part in business change programmes. In British Patent Application No. 0112277.9 a navigation mechanism has been described. In another British Patent Application No. 0118491.0 a mechanism has been described to synchronise hierarchy and graphical views of an organisation and in a third British Patent Application No. GB0319783.7 a mechanism is described to enable an unlimited collection of perspectives upon an organisation to be connected in a way that enables flexible navigation between views. While the current invention utilises some of that subject matter by permitting the management and synchronisation of variation for any business structure, thus increasing the power and effectiveness of the approach there is a need within the field of business architecture, analysis, transformation and planning, for a method that allows the management and synchronisation of collections of variants and this is not achieved by the current graphical implementations.

The aims of the present invention are to provide a method and apparatus that supports these operations to assist organisations to achieve coherence in complex business environments and to allow direct reuse of said graphical representations of the business environments while taking into account variations as they occur which is conventionally not feasible in large organisations due to the need to recognise differing requirements.

In a first aspect of the invention there is provided a method for the deployment and utilisation of a graphical representation of an organisation, said graphical representation including a plurality of identified elements which are incorporated within the organisation and at least one link provided between said elements and wherein the method includes the steps of generating the graphical representation and then using that representation to manage and synchronise the definition of required variation in structure and operations of the organisation.

In one embodiment the method includes any or any combination of the steps of analysis of the variation required, design, implementation and/or management.

In one embodiment the method, when implemented, results in the provision of a graphical structuring, navigation and diagramming facility, together with a generalised mechanism for dynamic alignment of related structures within the organisation. Typically the facility is provided within a business development and transformation system and interaction is achieved via a graphical user-interface.

In one embodiment the facility which is generated allows the management in a flexible way of variations on the structure or structures of the organisation and allows the analysis of the differences between these variants from more than one perspective within the organisation. This functionality contributes to coherent business definition and provides valuable information to those responsible for planning and co-ordinating business change.

Typically the utilisation of the method results in the generation of at least one graphical organisational model using capabilities that are structured so as to describe the construction of an organisation in terms of its diverse perspectives, each of which is defined in terms of component parts. The component parts of different perspectives can be defined in a number of predefined ways, one example being in accordance with properties of the perspective. References and linkages between components are defined within the graphical model, such that an element within one perspective (e.g. a product) can refer to or be linked directly to elements in another (e.g. risks associated with the product).

Preferably for any chosen part of the organisational model a variant can be created which is initially identical to the selection. Further variants can be created of the original model, and further variants can be created for any existing variant. Thus in accordance with the invention a series of variations on the original organisational model can be created and as the activities of business development progress, the details of these variant models will diverge. For example, the organisation structure in one country might diverge from the corresponding structure in another. The method of the invention enables the variant relationships to be investigated and navigated: for any element within a model allow the definition of whether it is a variant of another element, and which variants exist for it.

In accordance with a further aspect of the invention there is provided a method for the deployment and utilisation of a graphical representation of an organisation, said graphical representation including a plurality of identified elements which are incorporated within the organisation and at least one link provided between said elements and wherein the method includes the steps of generating the graphical representation and then using that representation to manage and synchronise the definition of required variation in structure and operations of the organisation and wherein at least one further graphical model is created, said graphical model representing a variant of the first generated model and the variation between the models caused by the change in condition of at least one element or component of the model.

In one embodiment parallel ("sibling") or successive ("parent-child") variants can be aligned and compared for assessment of differences. Preferably this comparison can be supported from many viewpoints, as is required with a complexity of changes or variants. Such viewpoints could be what are the structural differences between variants; what are the differences in terms of interfaces and referencing to other components; what are the differences in intent and detailed definition. The invention provides synchronised access to such viewpoints to enable comprehensive assessment to support business change.

In accordance with one embodiment of the invention the method incorporates the step of defining multiple variants of an organisational model of arbitrary complexity in a flexible and unlimited manner thereby allowing variants to be created of variants.

In a further embodiment there is provided the ability to identify variant relationships affecting any component within the graphical model, and to use these relationships to navigate directly to corresponding components within related variants of that model.

Preferably the corresponding variants are aligned and compared in a synchronised way from a plurality of viewpoints within the organisation structure.

Typically the method can be used to create a variant structure for a given business scope, which can range from a single function to a general network of related items.

Preferably the method allows the identification of whether a particular structure is a variant of another, and which variants currently exist for that structure, including the trail of variants of variants.

In one embodiment the invention allows the provision of the exploration of differences between a structure (or any component within it) and any of its variants and generates visual notations relating to the variants to inform and assist decision makers and planners.

The present invention therefore allows decision makers and planners to analyse the impact of a proposed change or variation in terms of corresponding impact on associated variant structures with the graphical representation. Furthermore cost reductions through re-use as far as possible of common components can be achieved as well as risk reduction through common control and alignment as keeping things synchronised reduces the risk of missing an important consequence of a planned change.

BRIEF DESCRIPTION OF THE DRAWINGS

Specific embodiments of the invention are now described with reference to the accompanying drawings wherein.

DETAILED DESCRIPTION

Figure 1:
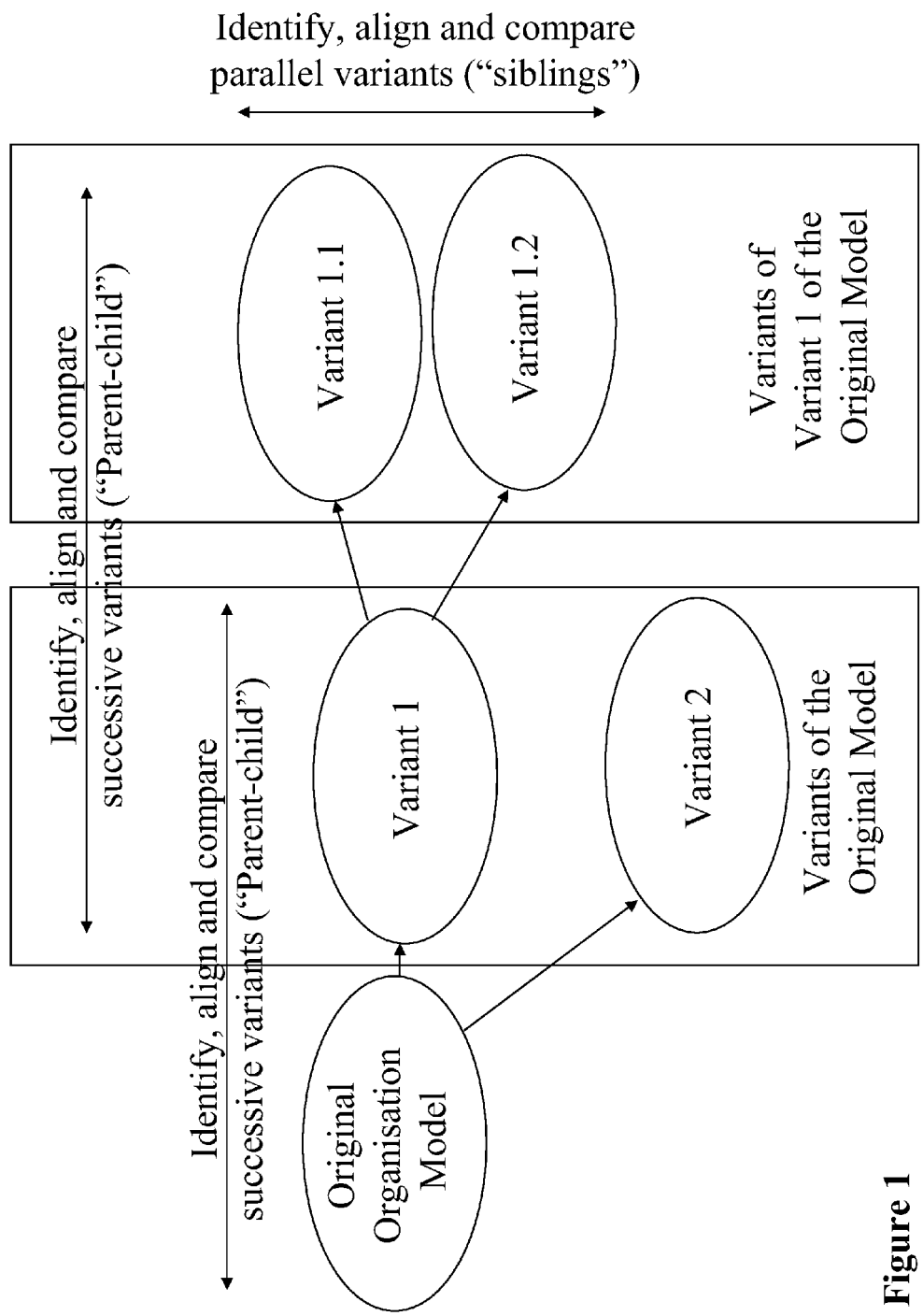
FIG. 1 illustrates the steps which can be followed in linking variant graphical models of an organisation.

Referring firstly to FIG. 1 there is illustrated the development of a series of graphical models of an organisation structure. The method in accordance with the invention allows the generation of a first or original organisation model using suitable graphical design tools. However in practical terms that organisation model is liable to change or variation, said changes or variations caused by external influences such as legislation changes, changes made internally on an office by office basis or across the organisation or the like. In accordance with the invention these changes are taken into account and a new graphical model changed for each variant or group of variants. As the original graphical model which is created incorporates links between the elements and components so the variation of one or a number of said elements or components can be indicated and the effect on other elements or components which are linked can also be identified and assessed and implemented in the new variant graphical models generated. In this Figure two variations have occurred resulting in the variant graphical model 1 and the variant graphical model 2 which are now unique and "stand alone" graphical models representing a particular organisation structure taking into account an identified variant or variants.

Furthermore in this embodiment yet further variants have occurred with respect to variant model 1 leading to the generation of two further variant graphical models 1.1 and 1.2. Thus it will be appreciated how each of the variant graphical models which is generated can be used as a reference tool to understand how and where the appropriate variant conditions apply.

Figure 2:
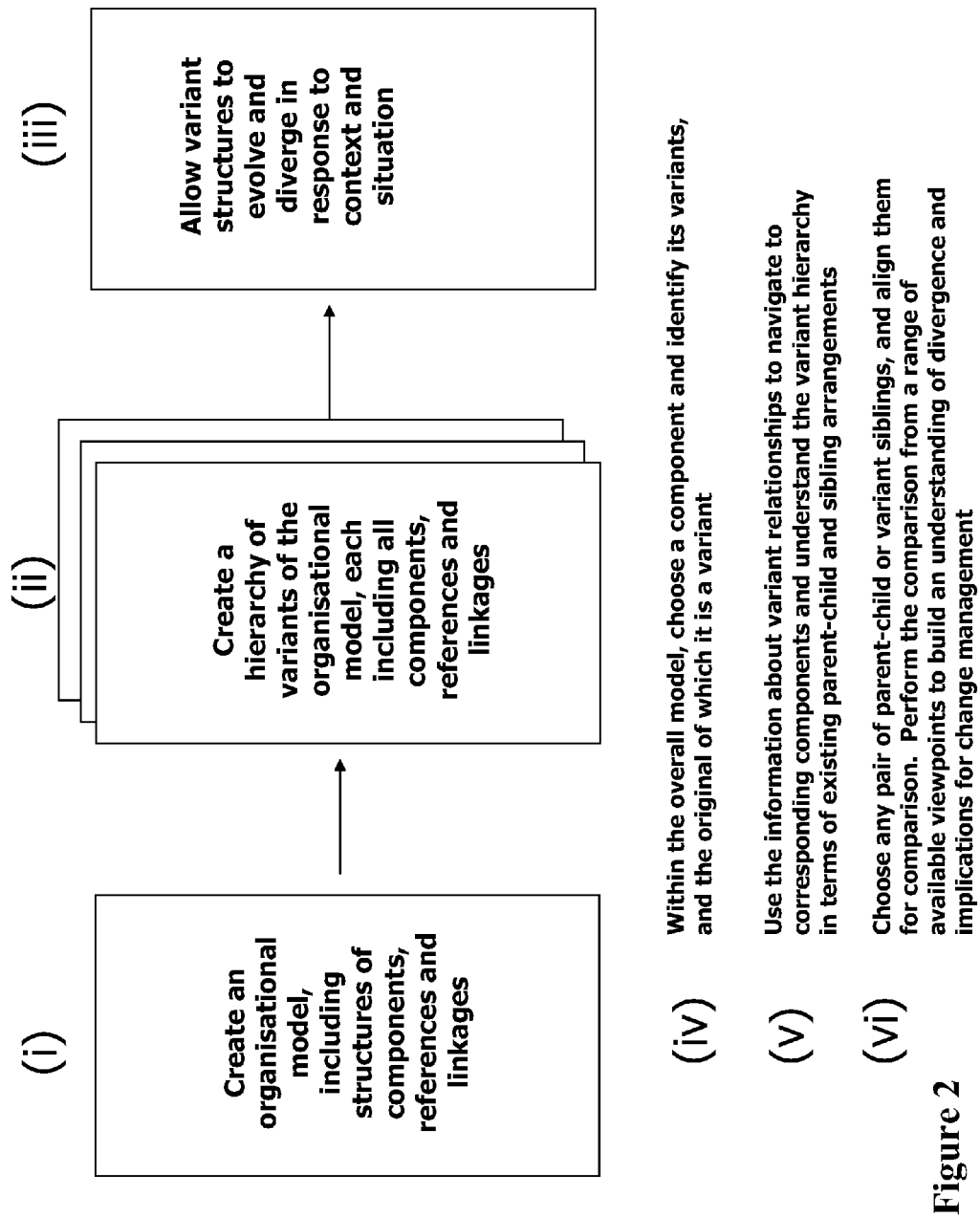
FIG. 2 illustrates the implementation of a method in accordance with one embodiment of the invention.

Turning now to FIG. 2 there is described the method in accordance with one embodiment of the invention wherein the first step (i) is to create an organisational model of required complexity and including structures of components or elements with references and linkages. The second step (ii) is to create a variant arrangement of required depth and breadth (in terms of siblings) at any level. Each variant will initially include all of the components, references and interfaces of the original graphical model. Then (iii) the variants which are referred to when generating further graphical models evolve in response to development considerations relating to the situation or context of the variations and the organisation.

Figure 3:
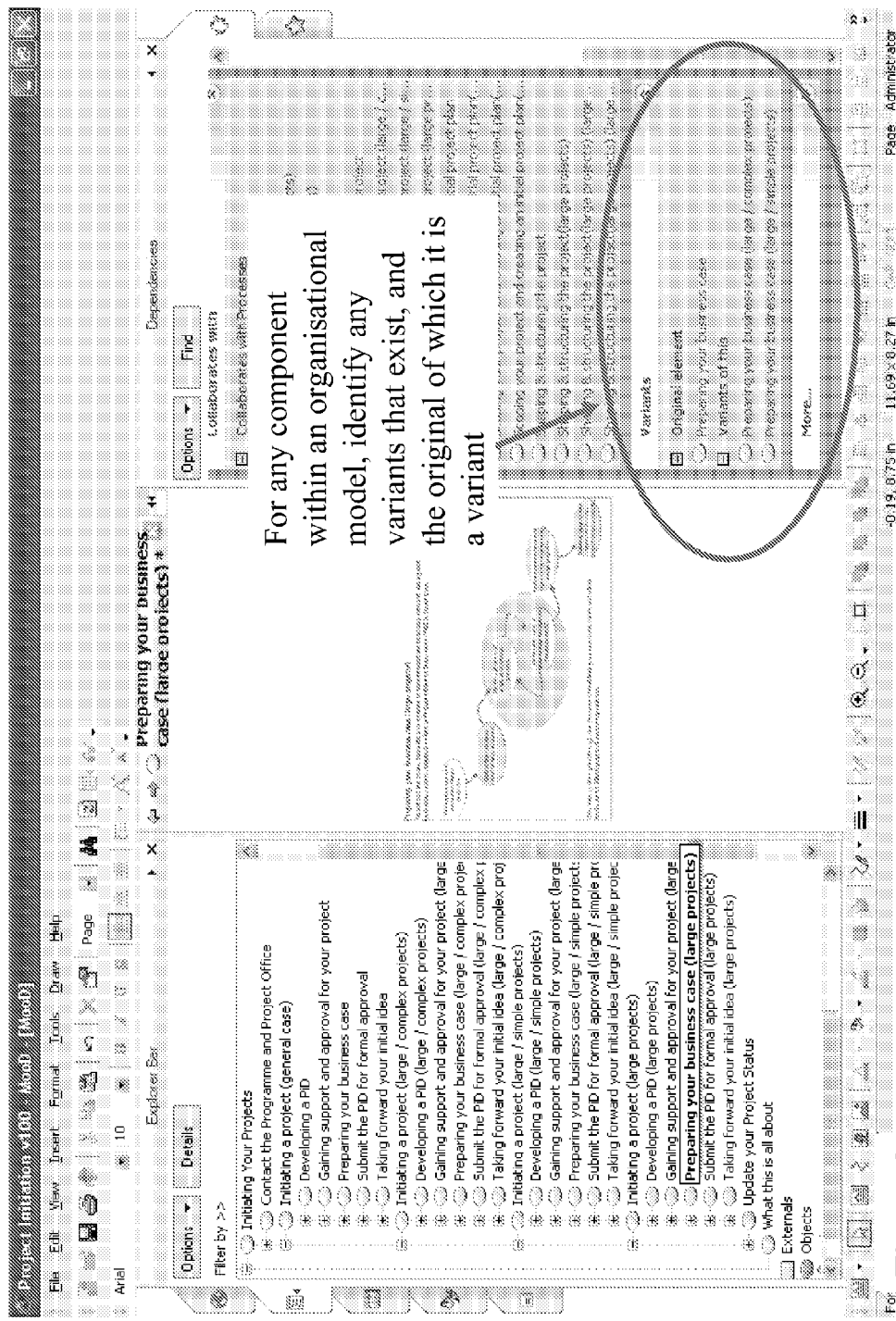
FIGS. 3 and 4 illustrate practical implementation of the invention in accordance with the invention.

Following the generation of the required graphical models then the step (iv) can be performed as required in response to a requirement to analyse a particular component or element of the graphical model. The analysis can be with respect to, for example, a variation requirement, the identification of its position within the variant hierarchy, what variants exist and/or of what it is a variant. One practical implementation of this is shown in FIG. 3 which is a screen shot of a graphical representation of one organisation model.

Figure 4:
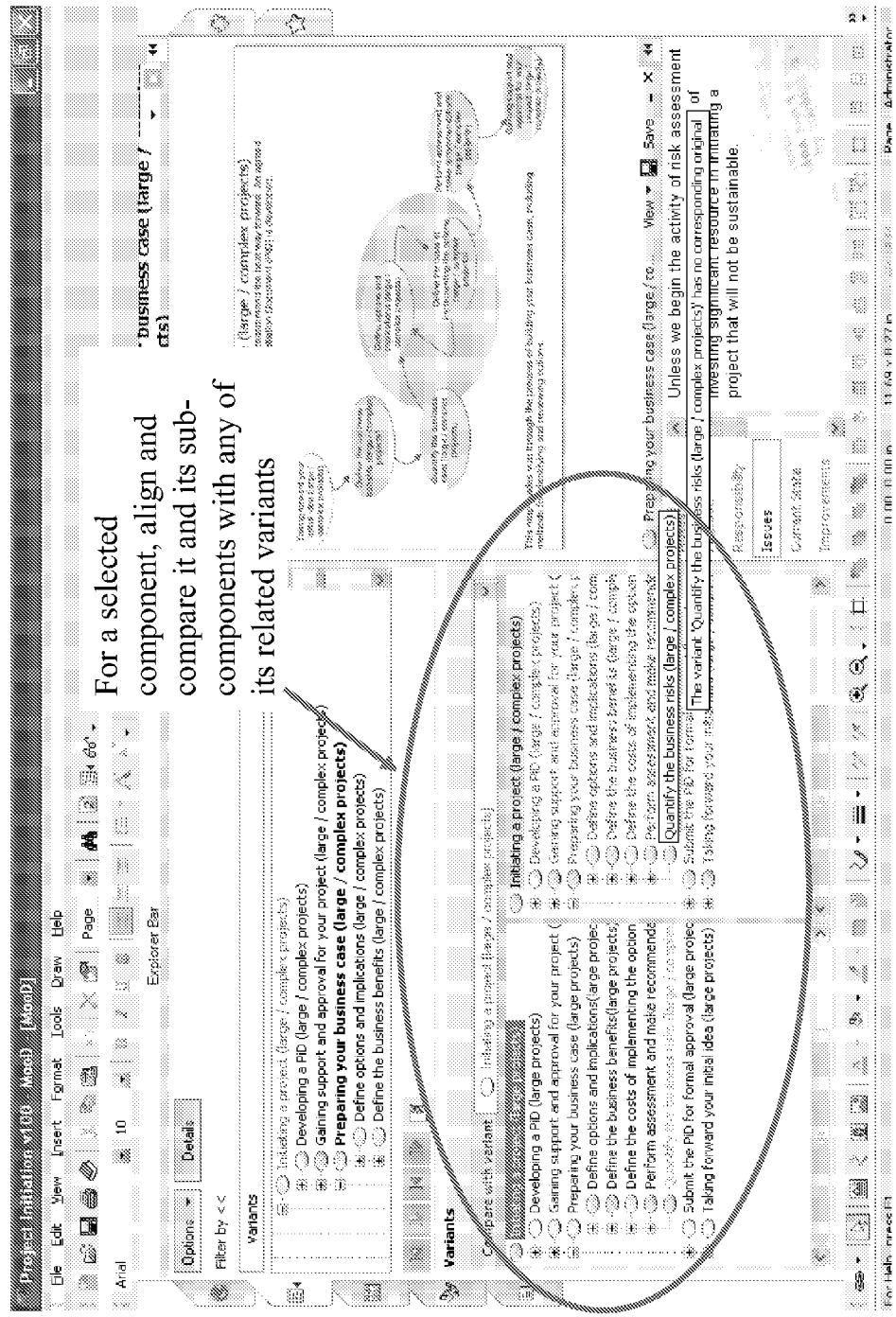

This information can then be used to navigate (v) through the relevant variant structures to develop understanding of the structures and their changes due to the variants. A more detailed assessment (vi) can be performed to allow the selection of corresponding pairs of variants (parent-child or sibling pairs), and the alignment of these from multiple viewpoints to analyse the differences, for example, to determine the impact of the proposed change. A practical implementation of this is shown in the screen shot included as FIG. 4 which shows a practical implementation of a graphical structure.

Turning now to the apparatus used in the method, this includes a business development and transformation tool. A software system providing a graphical user interface for the definition and manipulation of the elements and structures described in the method and mechanisms for definition of organisational models of arbitrary complexity, comprising components of arbitrary types with general mechanisms for referencing and interfacing.

Within the software system there is provided a mechanism that supports creation and management of variant structures, with the ability to support identification and navigation through such structures, with a further ability to align and compare corresponding variants in a synchronised manner from multiple viewpoints.

The functionality of this mechanism provides a unique ability for an organisation to understand, represent, communicate and analyse its complexity with the potential to manage change in a coherent, controlled and informed way.

The use of the graphical models and the variants thereof in accordance with the invention are increasingly used to define and communicate best practice within an organisation, with the potential benefit of enhanced business performance and the reduction in risk of failures of adherence to best practise, whether that best practise is defined within the organisation or by a regulatory body. Within such models that describe best practice, there is a requirement to define and manage variations in how tasks are performed, or structured. This reflects the complex environments in which modern businesses need to operate. The ability to maintain a connected view of these variations, especially in the face of a continuing need for change, is important to being able to understand and manage implications of proposed change. Consequently, a facility to model, navigate, align and compare the variations that exist within an organisation is an important contribution to successful development.

The invention described in this patent can be used as a central resource within an organisational development and change management methodology and toolset.

Thus as a result there is provided a method and apparatus which allow the creation of a variant structure for a given business scope, which can include anything from a single function to a general network of related things.

Furthermore organisations need to be able to identify whether a particular structure is a variant of another, and which variants currently exist for that structure, including the trail of variants of variants and explore the differences between a structure and any of its variants, using compelling visual notations that inform and assist decision makers and planners. The invention also enables decision makers and planners to analyse the impact of a proposed change, in terms of corresponding impact on associated variant structures.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method for the deployment and utilisation of a graphical representation of an organisation, the method comprising generating at least one parent graphical representation and at least one child representation using at least one computer, each graphical representation including a plurality of identified elements which are incorporated within the organisation and at least one link is provided between said elements, and using the graphical representations to manage, synchronise and define variations in the structure and operation of the organisation wherein a series of child variant graphical representations of the original parent organisational model are created and further variants are created for the existing parent organisational model and/or child variant, such that variations between the parent and child graphical representations and between child graphical representations are graphically aligned and compared for direct assessment of differences and the relationship affecting any element within the models are identified and used to directly navigate between and within said parent and child variants having a common element.

2. A method according to claim 1 wherein the method includes any or any combination of the steps of analysis of the variation required, design of the variation, implementation of the variation and/or management of the graphical representation.

3. A method according to claim 2 wherein the method, when implemented, results in the provision of a graphical structuring, navigation and diagramming facility.

4. A method according to claim 3, wherein the facility is provided within a business development and transformation system and interaction is achieved via a graphical user interface.

5. A method according to claim 4, wherein the method, when implemented, results in the provision of a graphical structuring, navigation and diagramming facility, and wherein the facility is provided within a business development and transformation system and interaction is achieved via a graphical user interface.

6. A method according to claim 1 wherein the graphical representations allows the user interaction with regard to the management and flexible variance of the structure or structures of the organisation and allows the user to view the analysis of the differences between these variants from more than one perspective within the organisation.

7. A method according to claim 6, wherein references and linkages between components are defined within the graphical representation and include linkages between elements in a plurality of perspectives.

8. A method according to claim 1, wherein a series of variations of graphical representations of the original parent organisational model can be created.

9. The method according to claim 1, said method is carried out on an apparatus comprising;
    at least one computer for deployment and utilisation of a graphical representation of an organisation;
    a business development and transformation tool;
    a software system providing a graphical user interface;
    mechanisms for definition of organisational models and wherein provided within the software system is a mechanism that supports the creation and management of variant structures and allows the alignment and comparison of corresponding currents in a synchronised manner from multiple viewpoints.

10. A method for the deployment and utilisation of a graphical representation of an organisation, the method comprising generating the graphical representation using at least one computer, said graphical representation including a plurality of identified elements which are incorporated within the organisation and at least one link provided between said elements, and using the graphical representation to manage and synchronise the definition of required variation in structure and operations of the organization wherein variants can be graphically aligned and compared for assessment of differences and wherein at least one further graphical representation is created, said further graphical representation representing a variant of the first generated graphical representation and the variation between the representation caused by the change in condition of at least one common element or component of the graphical representations wherein the representations are aligned horizontally and/or vertically for direct comparison and assessment of differences and the relationships affecting any common element within the models are identified and used to directly navigate between and within variants.

11. A method according to claim 10, wherein the method incorporates the step of defining multiple variants of an organisation or model of arbitrary complexity in a flexible and unlimited manner thereby allowing variants to be created of variants.

12. A method according to claim 11 wherein corresponding variants are aligned and compared in a synchronised way from a plurality of viewpoints within the organisation structure.

13. A method according to claim 12 wherein the method allows the identification of whether a particular structure is a variant of another and which variants currently exist for that structure.

14. The method according to claim 10, wherein said method is carried out on an apparatus comprising;
    at least one computer for deployment and utilisation of a graphical representation of an organisation;
    a business development and transformation tool;
    a software system providing a graphical user interface;
    mechanisms for definition of organisational models and wherein provided within the software system is a mechanism that supports the creation and management of variant structures and allows the alignment and comparison of corresponding currents in a synchronised manner from multiple viewpoints.

\* \* \* \* \*